United States Patent [19]

Kennedy

[11] Patent Number: 4,691,763
[45] Date of Patent: Sep. 8, 1987

[54] VENTILATOR INCLUDING A DOUBLE PASS COUNTERCURRENT HEAT EXCHANGER

[75] Inventor: Michael Kennedy, Yonkers, N.Y.

[73] Assignee: Brother Albert Welsh Foundation, New York, N.Y.

[21] Appl. No.: 745,791

[22] Filed: Jun. 17, 1985

[51] Int. Cl.[4] ............................................. F24H 3/02
[52] U.S. Cl. ....................................... 165/54; 165/164
[58] Field of Search ..................... 98/33.1; 165/54, 164

[56] References Cited

U.S. PATENT DOCUMENTS

| | | | |
|---|---|---|---|
| 3,829,285 | 8/1974 | Beck ..................................... | 432/223 |
| 3,854,530 | 12/1974 | Jouet et al. ...................... | 165/164 X |
| 3,999,603 | 12/1976 | Huggins ............................... | 165/111 |
| 4,047,881 | 9/1977 | Eschenauer et al. ............... | 431/215 |
| 4,102,632 | 7/1978 | Hastings .................................. | 432/3 |
| 4,156,625 | 5/1979 | Wachendorfer, Sr. ............. | 156/245 |
| 4,200,734 | 4/1980 | Muehlenbrock et al. ....... | 165/164 X |
| 4,338,996 | 7/1982 | Frank ..................................... | 165/57 |
| 4,377,400 | 3/1983 | Okamoto et al. ...................... | 55/269 |
| 4,382,359 | 5/1983 | Sampayo ................................. | 60/39 |
| 4,391,321 | 7/1983 | Thunberg ............................... | 165/54 |
| 4,412,425 | 11/1983 | Fukami et al. .......................... | 62/244 |
| 4,449,574 | 5/1984 | Yoshino et al. ....................... | 168/11 |
| 4,462,459 | 7/1984 | Schmidlin ............................. | 165/54 |
| 4,550,773 | 11/1985 | Martin ................................... | 165/54 |

FOREIGN PATENT DOCUMENTS

| 214788 | 12/1922 | Fed. Rep. of Germany ...... | 165/164 |
|---|---|---|---|
| 2506906 | 12/1982 | France .................................. | 165/54 |

OTHER PUBLICATIONS

"Air-to-Air Heat Exchangers for Homes," William A. Shurcliff, Brick House Publishing Co., Andover, Mass., pp. 111-162, 1982.

"Saskatchewan Conservation House," Saskatchewan Mineral Resources, Office of Energy Conservation, pp. 4-5, 7, 15, 17, and 20.

Primary Examiner—Larry I. Schwartz
Assistant Examiner—Steven E. Warner
Attorney, Agent, or Firm—Paul C. Scifo

[57] ABSTRACT

Disclosed is a ventilator including a heat exchanger having a fresh air channel and a stale air channel. The respective channels are pneumatically isolated, but, are arranged in contiguous and interwoven fashion such that incoming fresh air may pass in countercurrent heat exchange relation to the outgoing stale air twice. The fresh air channel has an inlet in communication with air external to the ventilated space and an outlet in communication with the ventilated space. The stale air channel has an inlet in communication with the ventilated space and an outlet in communication with the external space. The heat exchanger features heat transfer means in communication with the fresh and stale air channels which is formed by a septum having a first surface in heat exchange relation with the fresh air channel and a second surface in heat exchange relation with the stale air channel. The septum is wrapped in successive spaced turns to form alternating sections of the fresh air and stale air channels. The resulting combination of channel sections has a generally elliptically shaped profile, and includes two pseudo foci at one of which the fresh air outlet is located and at the other of which the stale air inlet is located. The fresh air inlet and the stale air outlet are locates at the other respective channel ends.

14 Claims, 3 Drawing Figures

VENTILATOR INCLUDING A DOUBLE PASS COUNTERCURRENT HEAT EXCHANGER

TECHNICAL FIELD

This invention relates generally to a ventilator including a countercurrent heat exchanger, and more particularly, to a ventilator including a double pass, countercurrent heat exchanger having a fresh air channel and a stale air channel which are contiguous to one another, the channels being wound upon one another so that the fresh air channel is interwoven with the stale air channel.

BACKGROUND INFORMATION

The trend in building design today is to structures of ever increasing energy efficiency. In view of the continuing increase in energy costs, architects, builders and buyers alike are eager to find ways of reducing the cost of heating their homes and office buildings in winter and cooling them in summer.

The principal approach taken has been to make the construction of, for example, a house, more tight fitting and to provide for greater use of insulation. By reducing the gaps and spaces that arise at such places as foundations, walls, windows, doors, etc., infiltration of outside air can be reduced. Additionally, by increasing the amount and quality of the insulation between walls, in ceilings, etc., heat transfer out of and into the house can be limited. The result is that less heat is lost in winter and accumulated in summer, and accordingly, the cost for maintaining the house at a comfortable temperature is minimized.

However, by making the house "airtight", a potential hazard is created. Living space generates and accumulates pollutants which if not eliminated, would, at best, be annoying, and, at worst, create a health hazard. For example, carbon monoxide and carbon dioxide are generated by the breathing of house occupants, and operation of gas and wood stoves and fire places. Chemical vapors such as formaldehyde are given off by building and furniture materials like plywood, adhesives, insulation and furniture padding. Further, chemical sprays such as pesticides and cleaning agents give off noxious fumes. Still further, water vapor and odors are produced by cooking, showering, bathroom use, and clothes laundering. Additionally, radioactive gases such as Radon, which arise from natural radioactive disintegration in soil and building brick and masonry, give rise to insidious carcinogenic pollution. If left unchecked, these pollutants could rise to dangerous levels.

To avoid this health threat, while at the some time minimizing energy costs, architects and builders have resorted to use of special ventilators. These ventilators don't simply introduce fresh air from outside the house, for to do so would defeat the energy saving strategy of tighter construction and increased insulation use. Rather, these ventilators include heat exchangers which conserve at least some of the energy expended in maintaining the house at a comfortable temperature. In operation, the ventilators gather a stream of fresh air from outside the house, but, before introducing it, preheat or precool it, depending on the season, with the stale air being exhausted. Most typically, the gathered fresh air is passed in heat exchange relation to the stale air so that heat may be transferred from the warmer to the cooler. This enables a portion of the energy expended in maintaining the room at a comfortable temperature to be conserved by either extracting heat from or adding heat to the stale air, before it is exhausted, and, respectively, either adding heat to or extracting heat from the fresh air being supplied.

William A. Shurcliff, a noted expert in the field of thermal efficiency in building design, has written on this subject. In his book entitled: *AIR-TO-HEAT EXCHANGERS FOR HOMES*, published by Brick Publishing Co., Inc., Andover, Mass., he describes in detail the operation and design of heat exchanging ventilators, and additionally, describes the construction and operation of a number of currently available types.

As pointed out by Shurcliff, the savings in energy costs that a heat exchanging ventilator can provide, as for example in time of winter, is the product of the ventilator's flow rate and the exchange efficiency, multiplied by, a constant that depends on the cost of energy to heat and the expected "degree-day" factor; i.e., need for heat, of the geographical area where the ventilator is to be used.

Shurcliff defines the flow rate of the ventilator as the volume of fresh air supplied by the ventilator per unit time. Further, he defines ventilator efficiency as the heat per unit weight of air transferred to the fresh, incoming air, divided by, the difference in heat per unit weight of air being exhausted and fresh air outside the house. In the absence of condensation in the stale air exhaust stream, this reduces to the difference in temperature between the fresh air introduced into the ventilated room and the outside air temperature, divided by, the difference in temperature between the stale air in the room and the fresh air outside.

Therefore, the greater the flow of air the ventilator can handle, and, in the case of winter heating, the higher the temperature of the fresh air supplied, the greater the dollar savings the ventilator can provide.

As also noted by Shurcliff, in order to determine whether a particular ventilator design will be cost effective, the dollar savings it produces must be compared to the ventilator's purchase price. According, not only must the operation of the ventilator be effective, i.e. high flow rate and high efficiency, but also, its purchase price, and therefore it cost of construction must be low if one is to maximize the return on investment.

As a further consideration, the ventilator should also have a form factor that renders its physical integration into the structure to be ventilated convenient. While, as shown by Shurcliff, a number of heat exchanging ventilators exist which provide acceptable flow rates and efficiencies, most are not of a size that permits convenient and unobtrusive installation; e.g., within the wall of a house or other building to be ventilated.

SUMMARY OF INVENTION

It is therefore an object of this invention to provide a heat exchanging ventilator which can supply a stream of fresh air to a living space so as to maintain pollutants within the space at an acceptable level, and to further exchange heat between the outgoing stale air and the incoming fresh air.

It is a further object of this invention to provide a heat exchanging ventilator that is capable of high flow rate operation.

It is a yet further object of this invention to provide a heat exchanging ventilator that is capable of high efficiency operation.

It is a still further object of this invention to provide a heat exchanging ventilator having a combined high flow rate and high efficiency of operation.

It is yet a further object of this invention to provide a heat exchanging ventilator or simple construction so as to minimize the cost of construction.

And it is a yet another object of this invention to provide a heat exchanging ventilator having a form which may be conveniently fit within a wall of a house of other structure.

Briefly, the ventilator in accordance with this invention achieves the desired objects by including a heat exchanger having conduit means which defines an interwoven fresh air channel and a stale air channel. These channels are arranged such that incoming fresh air is able to pass in countercurrent heat exchange relation with the outgoing stale air twice.

In preferred form, the fresh air channel is provided with a first end in communication with air external to the space to be ventilated; for example, a house or a room of a house. At this first end, an inlet is provided for receiving the fresh air. The fresh air channel also includes a second end in communication with the room to be ventilated. At the second end, an outlet is provided for exhausting fresh air into the room. Further, the stale air channel is provided with a first end also in communication with the room to be ventilated. At the stale air channel first end, an inlet is provided for receiving air to be exhausted from the room. Additionally, the stale air channel includes a second end in communication with air external to the ventilated room. At the stale air channel second end, an outlet is provided for exhausting the stale air from the ventilator.

The fresh air and stale air channels are pneumatically isolated from one another so that air from the respective channels is not commingled. This prevents the fresh air from being corrupted with pollutants before it is introduced. Additionally, the two channels are continuous over their lengths.

Still further, the ventilator heat exchanger includes heat transfer means in communication with the fresh air and stale air channel that enables heat to be exchanged between the air in the two channels. In accordance with this invention, the fresh air channel is contiguous to and wound upon the stale air channel such that the fresh air channel is interwoven with the stale air channel, and so that air in the fresh air channel passes in heat exchange relation to the stale channel twice. Further, the fresh air channel and stale air channel are oriented relative to one another such that air in the fresh air channel flows in a direction countercurrent to air flowing in the stale air channel over a majority of the stale air channel length.

In preferred form, the heat transfer means of the ventilator heat exchanger includes a septum having a first surface in heat exchange relation with the fresh air channel and a second surface in heat exchange relation with the stale air channel. Also, the first and second septum surfaces are in thermal communication with one another so that heat flows from the surface in contact with air of higher temperature to the surface in contact with air of lower temperature.

In this form, the septum is wrapped in successive and spaced turns to form alternating sections of the fresh air and stale air channel respectively. The resulting combination of channel sections has a generally elliptically shaped profile, and includes two pseudo foci, at one of which the stale air inlet is located, and at the other of which the fresh air outlet is located.

In preferred form, the fresh air inlet includes a controllable blower means for pushing fresh air through the ventilator heat exchanger at variable rates. Additionally, the stale air outlet also includes a controllable blower means for drawing stale air through the ventilator heat exchanger at variable rates.

Continuing, in preferred form, the heat transfer septum is in the form of a single sheet of material having high thermal conductivity, such as aluminum or steel, which is wound about the stale air inlet and the fresh air outlet in successive spaced turns to form the interwoven fresh and stale air channel sections. Still further, in preferred form, the fresh air inlet and the stale air outlet as well as the fresh air outlet and the stale inlet are sufficiently spaced to avoid significant commingling of the respective air streams.

The foregoing, and other objects features and advantages of the invention will become apparent from the following more detailed description of a preferred embodiment, as illustrated in the accompanied figures.

DETAILED DESCRIPTION

Figure 1:
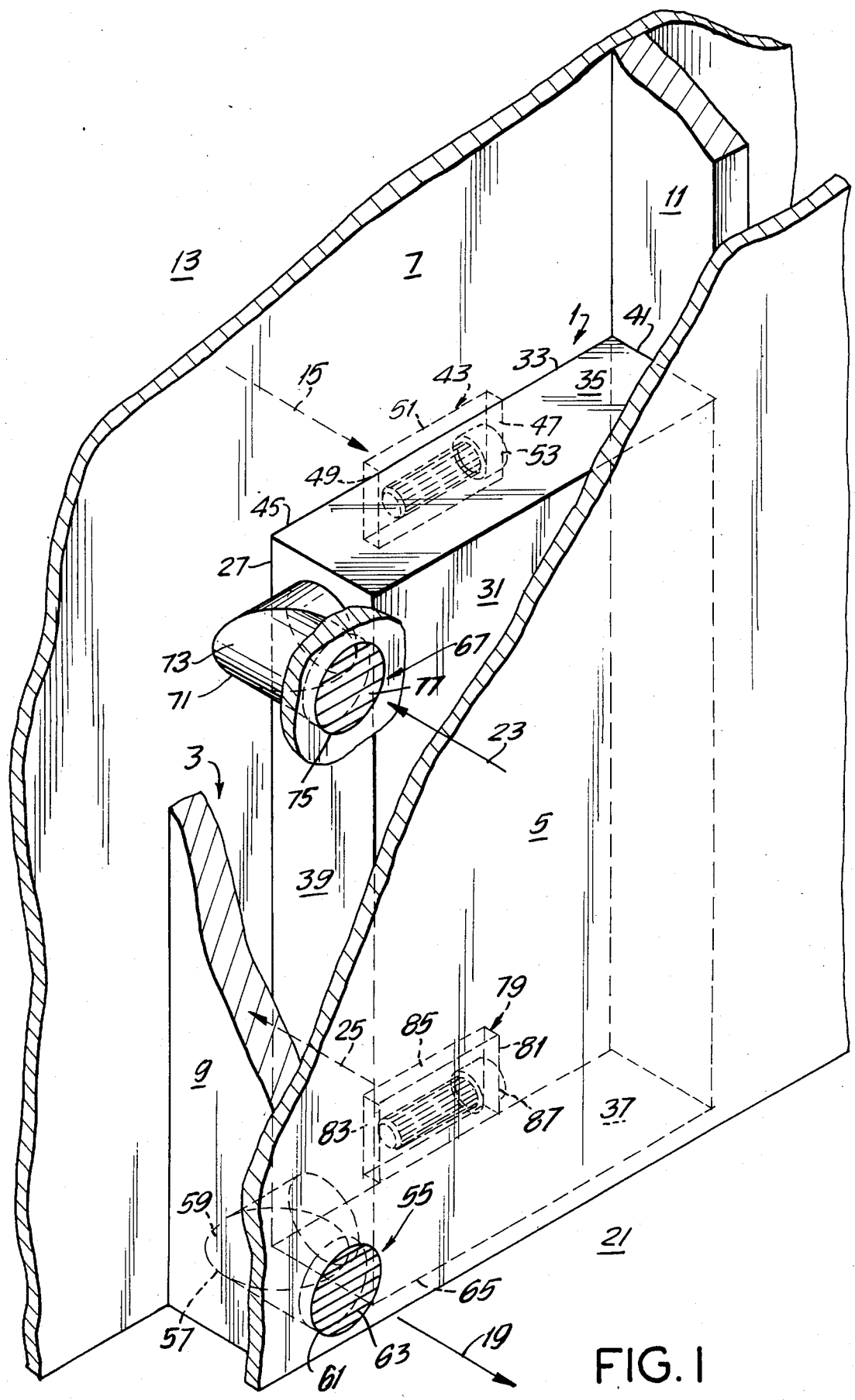
FIG. 1 is a fragmented, isometric view of the ventilator in accordance with this invention as installed within the wall of a house.
Figure 2:
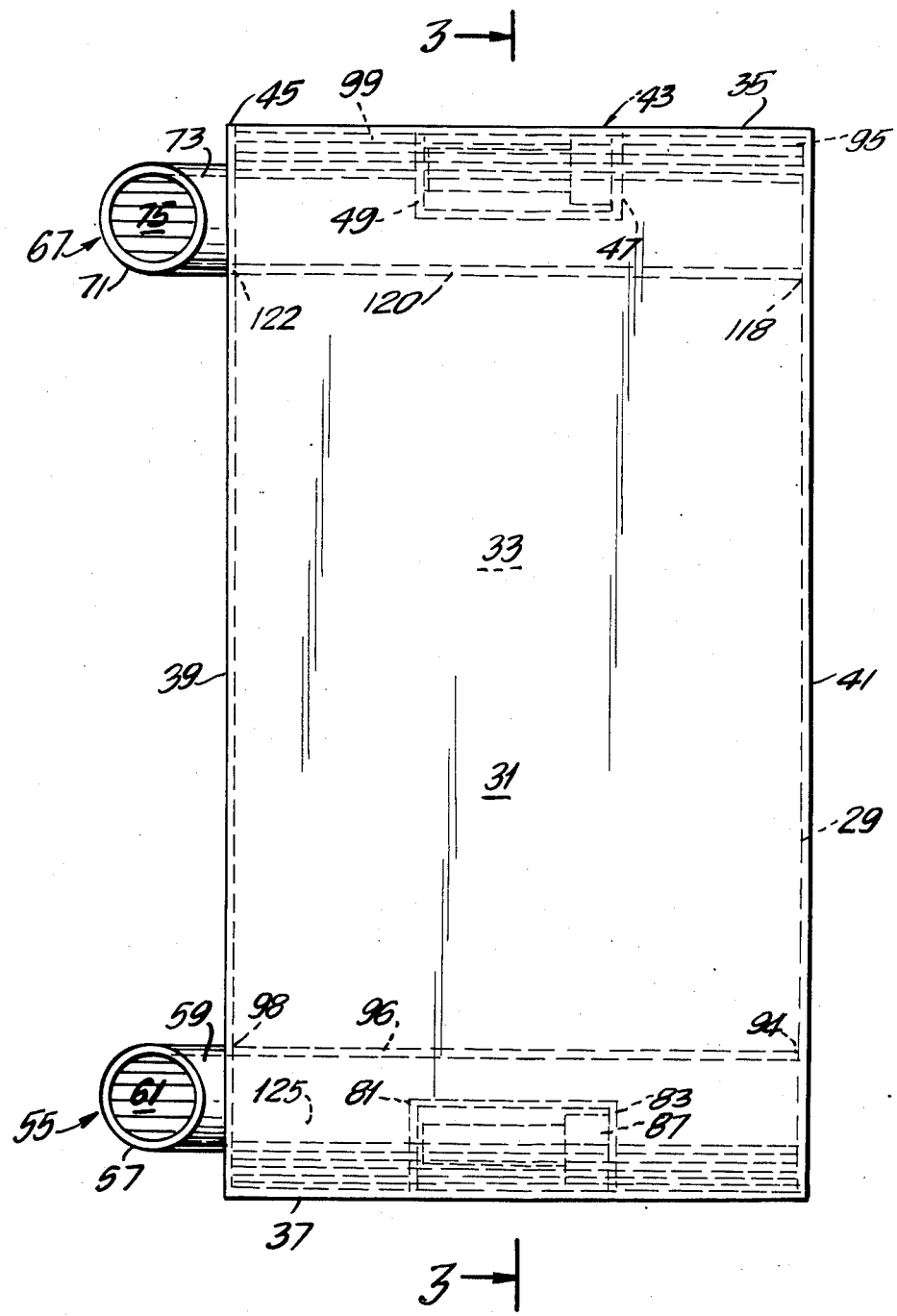
FIG. 2 is a front, elevation view of the ventilator in accordance with this invention.
Figure 3:
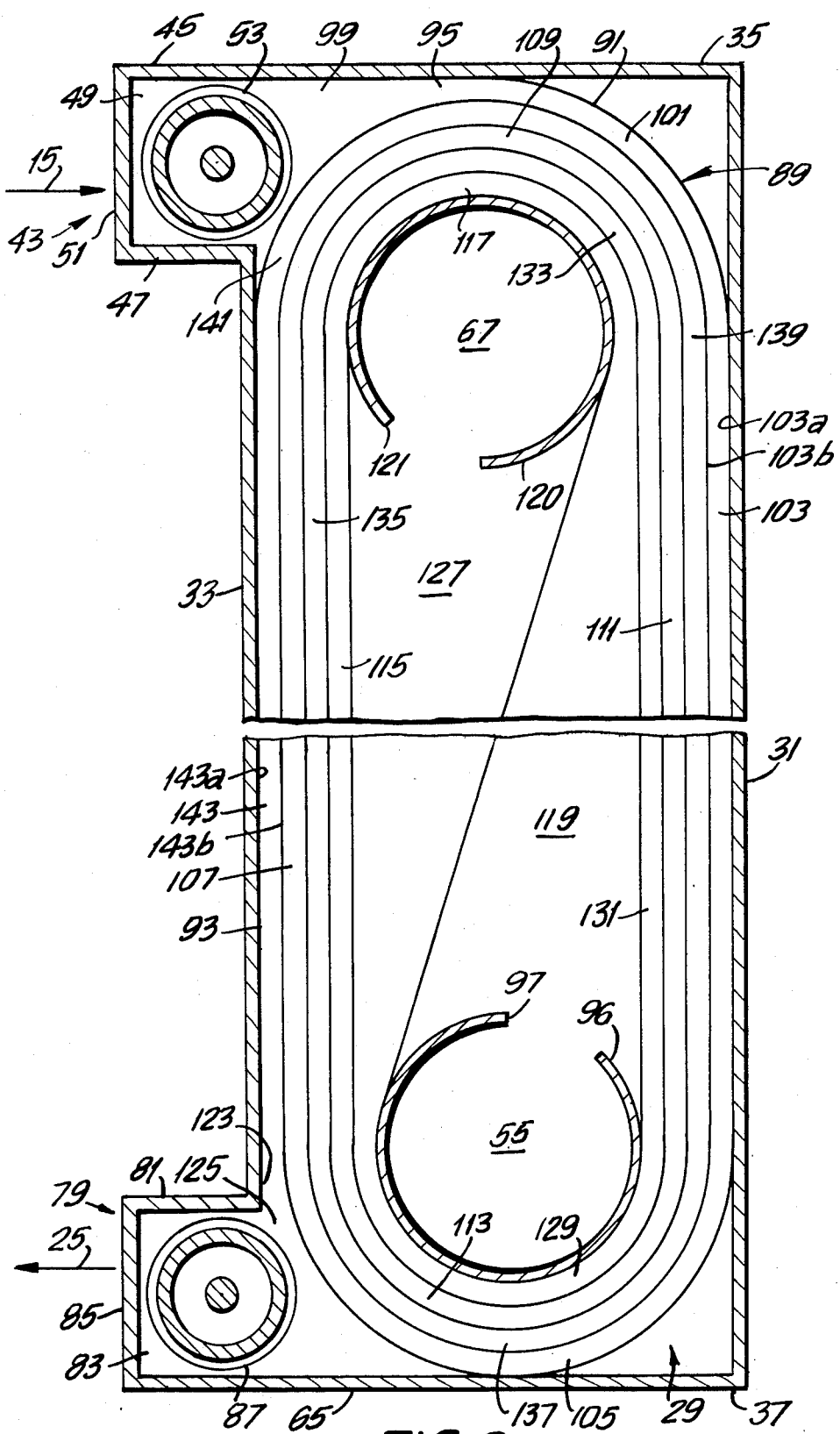
FIG. 3 is a side section view of the ventilator in accordance with this invention taken along line 3—3 of FIG. 2.

The heat exchanging ventilator in accordance with this invention is shown in FIGS. 1 to 3.

In FIG. 1, ventilator 1 is seen as it might appear installed in the wall of a house, the rooms of which are to be ventilated. As shown, ventilator 1 is located in space 3, between interior wall 5, exterior wall 7 and support beams 9 and 11. Ventilator 1 is arranged to receive fresh air, schematically shown by arrow 15, from space 13 external to the house, at the prevailing temperature. Ventilator 1 is further arranged to exhaust the fresh air to room 21 to be ventilated, at a temperature approaching that of room 21, as shown schematically by arrow 19. Additionally, ventilator 1 is arranged to receive stale air, schematically shown by arrow 23, at room temperature, from room 21, and exhaust it to space 13 at a temperature approaching that of space 13, as schematically shown by arrow 25.

Continuing with reference to FIG. 1, ventilator 1 is seen to include a housing 27. Housing 27 contains the ventilator heat exchanger 29, and its associated ducting better seen in FIGS. 2 and 3. As shown in FIG. 1, housing 27 is in the form of a rectangular volume that fits conveniently between interior wall 5 and exterior wall 7. Housing 27 has a front wall 31, a back wall 33, top wall 35, bottom wall 37 and side walls, 39 and 41, respectively.

As seen in FIG. 1, ventilator 1 includes a fresh air inlet, shown generally at 43, for receiving fresh air 15. Inlet 43 is located at upper end 45 of housing 27, in rear wall 33. Inlet 43 includes a duct 47 having an outer section 49 which extends through exterior wall 7. A fresh air inlet port 51 is formed by the external open end of duct section 49.

Fresh air inlet 43 also includes a blower 53 mounted within duct 47 for drawing fresh air 15 through port 51 to heat exchanger 29. In preferred form, blower 53 is electrical and of conventional type well known in the art. Blower 53 includes means, also well known in the art, for controlling blower speed, and with it the fresh air flow rate in heat exchanger 29. To protect blower 53, fresh air inlet port 51 may be provided with grill work or screening, which for clarity of the drawing is not shown, to block entry of debris; e.g., leaves, paper, etc., and animals.

Ventilator 1 also includes a fresh air outlet, shown generally at 55, for exhausting fresh air 19 to room 21. Outlet 55 is located at the lower end 65 of housing 27 in housing side wall 39. Fresh air outlet 55 includes a duct 57 having a cylindrical, right angle outer section 59 which extends through interior wall 5. Fresh air outlet 55 also includes an outlet port 61 at the exterior end of duct section 57. Outlet 55 is in pneumatic communication with fresh inlet 43 through heat exchanger 29 as shown in FIGS. 2 and 3.

Like inlet 43, fresh air outlet may include grill work or screening 63 for restricting access to ventilator 1 from within room 21; as for example, by children or pets. Filter means, also not shown for the sake of clarity may be placed either at the fresh air inlet port 51 or outlet port 61 to filter particulate matter; e.g., soot, dust, etc., from the air before it enters room 21. In preferred form, the filter is placed at the fresh air inlet port 51 to protect the ventilator heat exchanger 29 as well as room 21. As would be appreciated by those skilled in the art, blower means 53 could be located at outlet 55 as an alternative to location at inlet 43. Where blower means 53 is located at outlet 55, blower 53 would be arranged to draw air through exchanger 29.

Still with reference to FIG. 1, ventilator 1 also includes a stale air inlet, shown generally at 67, for receiving room stale air 23. Stale air inlet 67 is located at the upper end 45 of housing 27 in side wall 39. Inlet 67 includes a duct 71 having an outer section 73 which extends through interior wall 5. Duct 71 is provided with a port 75 at the exterior end thereof. Inlet 67 is also provided with grill work or screening 77 for restricting access to ventilator 1. In preferred form, a filter, not shown, may be provided at inlet port 75 to prevent accumulation of lint and grease within heat exchanger 29.

Ventilator 1 further includes a stale air outlet, shown generally at 79, for exhausting stale air 25 to space 13. Stale air outlet 79 is located at lower housing end 65 in housing rear wall 33. As shown, outlet 79 includes a duct 81 having an outer section 83 which extends through exterior wall 7. Outlet 79 is maintained in pneumatic communication with stale air inlet 67 by means of heat exchanger 29. A stale air exhaust port 85 is provided at the exterior end of duct 81.

Outlet 79 further includes a blower 87 mounted within duct 81 for drawing stale air 23 through intake port 75 to heat exchanger 29. Like fresh air intake blower 53, stale air exhaust blower 87 is electrical, and includes means known in the art for controlling its speed, and subsequently the flow rate of stale air through heat exchanger 29. As in the case of fresh air inlet 43, stale air exhaust 79, may include grill work or screening at port 85, not shown, to limit access to ventilator 1. As would be appreciated by those skilled in the art, blower means 87 could be located at inlet 67 as an alternative to location at outlet 79. When located at inlet 67, blower means 87 would be arranged to push air through exchanger 29.

In preferred form, fresh air inlet 67 and stale air outlet 79 as well as fresh air outlet 55 and stale inlet 67 are sufficiently spaced to avoid significant mixing of the respective air streams 15, 25 and 19, 23. Further, and as would be appreciated by those skilled in the art, the locations of the inlet—outlet pairs could be exchanged without affection operation of the ventilator.

As noted, while one of the principal objectives of ventilator 1 is to provide a stream of fresh air to room 21 in order to maintain pollutants at a safe level, it is a further objective to conserve energy which has been expended to maintain the temperature of room 21 at a comfortable level. Where energy has been expended to raise room temperature, as for example by heating in winter, or reduce room temperature, as by cooling in summer, ventilator 1 seeks to conserve that energy by exchanging heat between the outgoing stale air and the incoming fresh air. Particularly, in winter, ventilator 1 extracts heat from exhausted stale air 23 and supplies it to incoming fresh air 15. In summer, the ventilator extracts heat from incoming fresh air 15 and dumps it to outgoing stale air 23.

To achieve this end, ventilator 1 includes a heat exchanger 29. As best seen in FIG. 3, heat exchanger 29 includes conduit means 89, arranged within housing 27. Conduit means 89, in accordance with this invention, is configured to form a fresh air channel 91 and a stale air channel 93.

Fresh air channel 91 extends from a first end 95, at fresh air inlet 43, to a second end 97 at fresh air outlet 55. At inlet 43, channel first end 95 is pneumatically coupled to fresh air intake duct 47, at duct section inner section 99. Duct inner section 99 is located downstream of intake blower 53, and is in pneumatic communication with above noted fresh air duct outer section 49 and port 51, which are located upstream of blower 53. With reference to FIG. 2, in preferred form; duct outer section 49 is rectangular, and located in housing rear wall 33 at housing upper end 45, extending centrally of, and along a portion of the width of wall 33. Duct inner section 99, on the other hand, extends the width of exchanger 29 at fresh air channel first end 95.

With reference to FIG. 3, fresh air outlet 55 at conduit end 97 is seen to include duct inner section 96. As best seen in FIG. 2, duct inner section 96 is cylindrical in form, and is coupled at a first end 98 to duct section 59 and outlet port 61. Duct section 96 is closed at second end 94, as will be more fully described hereafter. Continuing with reference to FIG. 3, inner section 96 is also provided with a slot which extends the length of section 96, and defines second end 97 of fresh air channel 91.

As shown in FIG. 3, fresh air channel 91 is seen to include a plurality of sections, 101, 103, 105, 107, 109, 111, 113, 115, 117 and 119, which are arranged in end to end relation, and which extend sequentially from first channel end 95 to second channel end 97. Sections 101 to 119 are seen to alternate in form between arcuate and linear, starting with semicircular section 101 and ending with linear section 119. The sections so combined form a continuous channel having a generally elliptical profile that spirals inwardly toward the center of the exchanger in a number of wound and spaced turns.

Stale air channel 93 on the other hand extends from a first end 121, at stale air inlet 67, to a second end 123 at stale air outlet 79. As shown in FIG. 3, stale air outlet duct 81 has a duct inner section 125 which is pneumatically coupled with stale air second channel end 123. Stale air duct 125 is located upstream of exhaust blower 87, and is in pneumatic communication with above noted duct outer section 83 and exhaust port 85, which are down stream of blower 87. As shown in FIG. 2, in preferred form, duct outer section 83 is rectangular, and located in housing rear wall 33, at housing lower end 65, extending centrally along a portion of the width of wall 33. Duct inner section 125, on the other hand extends the width of exchanger 29, at stale air second channel end 125.

Returning to FIG. 3, stale air inlet 67 at conduit end 121 is seen to include duct inner section 120. Inner section 120 is cylindrical in form, and is coupled at one end 122 to duct outer section 73 and inlet port 75, as best seen in FIG. 2. As shown in FIG. 3, inner section 120 is also provided with a slot which extends the length of section 120, and defines first end 121 of stale air channel 93. Duct inner section 120 is closed at a second end 118, as will be more fully described hereafter.

With reference to FIG. 3, stale air channel 93 is seen to also include a plurality of sections. The channel sections are designated 127, 129, 131, 133, 135, 135, 139, 141 and 143, and are arranged in end to end relation. Sections 127 to 143 extend sequentially from first channel end 121, to second channel 123, and are seen to alternate in form between linear and arcuate sections, starting with linear section 127 and ending with linear section 143. The sections so combined form a continuous channel having a generally elliptical profile that spirals outwardly to the perimeter of exchanger 27 in a number of wound and spaced turns.

Further, fresh air channel 91 is seen to be contiguous to, and wound upon stale channel 93 such that the sections of fresh air channel 91 are interwoven with the sections of the stale air channel 93.

As shown in FIGS. 2 and 3, the various air channel sections each include outer and inner walls as well as side walls. Since numbering all walls for all channel sections would overly burden the clarity of the figures, if has been omitted. However, in order that the sense of "outer" and "inner", as it applies to the channel walls be understood, reference should be made to fresh air channel section 103 and stale air channel section 143 in FIG. 3. As seen there, the outer walls of channel sections 103 and 143 are respectively designated 103a and 143a, and their inner walls designated 103b and 143b.

With regard to the interweaving of channel 91 and 93, and as seen in FIG. 3, fresh air channel section 101 and duct inner section 99 are wound upon stale air channel section 141 such that the inner wall of section 103 and duct section 99 overlays the outer wall of stale air channel section 143 in the sense above describes. Likewise, the inner wall of fresh air channel section 103, 105, 107, 109, 111, 113, and 115 respectively, overlay the outer wall of stale air channel sections 139, 137, 135, 133, 131, 129 and 127.

Further, and in accordance with this invention, as a result of the fresh air channel sections being wound upon the stale air channel sections, sections of stale air channel 93 overlay sections of fresh air channel 91. For example, the inner wall of stale air channel sections 143, 141, 139, 137, 135, 133, and 131 respectively, overlay the outer wall of fresh air sections 107, 109, 111, 113, 115 and 119.

Additionally, the inner wall of fresh air channel section 117 overlays at least a portion of the outer wall of stale air intake duct section 120, and the inner wall of stale air channel section 129 overlays at least a portion of the outer wall of fresh air outlet duct section 96. Still further, the inner wall of fresh air channel section 119 and inner wall of stale air section 127 overlay each other.

As a consequence of the interweaving, the fresh air channel overlay sections of the stale air channel twice. For example, fresh air channel sections 101, 109 overlay the outer and inner walls of stale air section 141; sections 103, 111 overlay the outer and inner walls of section 139; sections 105, 113 overlay the outer and inner walls of section 137; sections 107, 115 overlay the outer and inner walls of section 135; sections 109, 117 overlay the outer and inner walls of section 133; sections 111, 119 overlay the outer and inner walls of section 131; sections 113 and duct section 99 overlay the outer and inner walls of section 129; and section 115, 119 overlay the outer and inner walls of section 127.

As a result of this, and in accordance with the invention, air in fresh air channel 91, as it moves from fresh air inlet 47 to fresh air outlet 55, passes in heat exchange relation to the stale air channel twice. More will be said on this point hereafter.

A further consequence of this interweaving is that a compact structure is defined which may be conveniently located within the wall of a house to be ventilated. Particularly, and with continuing reference to FIG. 3, as noted, the profile of the fresh air channel is generally elliptical and spirals inwardly of exchanger 29, while the profile of the stale air channel is generally elliptical and spitals outwardly of exchanger 29. In combination, the respective spirals interweave and complement one another to form a more generally elliptical profile. The result of this arrangement is that two pseudo foci are defined for the structure which provide space efficient location points for the stale air intake and the fresh air exhaust, thereby providing the structure with a high degree of compactness.

As noted, heat exchanger 29 also includes a heat transfer means for exchanging heat between air in the fresh air channel and air in the stale air channel. In accordance with this invention, the heat transfer means is formed by a septum that separates the contiguous sections of the fresh air and stale air channels. The septum is formed with a first surface in heat transfer relation with air in the fresh air channel and a second surface in heat transfer relation with air in the stale air channel. Further, the septum first and second surfaces are configured to be in thermal communication with one another.

In the preferred embodiment shown in the figures, the septum is formed by a common wall between the contiguous air channels; for example, the common wall separating fresh air channel section 103 and stale air channel section 139. As illustrated by fresh air section 103 and stale air section 139, the inner surface of section 103's inner wall corresponds to the first septum surface and the inner surface of the section 139's outer wall corresponds to the second septum surface.

As is clear from FIG. 3, the heat transfer means; that is, the septum, extends the length of the wall sections which overlap as described above. Further, where the fresh air channel overlays the stale air channel sections twice, the septum is presented to the respective stale channel twice, and air in the fresh air channel, as it flows from inlet 47 to outlet 55, can pass in heat exchange relation to the stale air channel twice. This provides a "double" pass for the heat exchange process.

In the preferred form shown in FIG. 3, the septum is formed by a single sheet of material of high thermal conductivity; e.g., aluminum, steel, or other suitable material known in the art. The sheet, is wound upon stale air inlet duct section 120 and fresh air outlet duct section 96 in continuous and spaced fashion to form a desired number of turns determined by the planned heat exchange ability and efficiency for the exchanger. The sheet is provided a width corresponding to twice the width of housing 27; i.e., the distance between walls 39, 41, and a length corresponding substantially to the height of the housing; i.e., the distance between housing bottom wall 37 and top wall 35, multiplied by the number of turns that can be accumulated within the depth of housing 27; i.e., the distance between housing walls 31, 33. As would be obvious to those skilled in the art, the greater the area of the sheet; i.e., its width and length, the greater the amount of heat transfer surface and, therefore the heat transferability of exchanger 29.

As shown in FIG. 2, the fresh air channel and the stale air channel are provided with side walls that close off the channel segments laterally. The side walls may be provided as separate elements, not shown; e.g., rubber gaskets, or the like, fit at the channel lateral ends, between the respective outer and inner channel walls. Alternatively, the closures may be formed by the housing side walls 39, 41 respectively. To increase thermal effectiveness, of ventilator 1, housing 27 may include insulation, not shown, to reduce loss of heat to the surroundings. Housing 27 may be made of any convenient material consistent with a low cost of construction, and in preferred form could itself be thermally insulating.

As noted above, the savings in energy costs a heat exchanging ventilator may provide is proportional to the product of its flow rate and corresponding efficiency. In the case of the present invention, the flow rate is dependent upon the cross-sectional area of the fresh air and stale air channels, and the pressure head establish by fresh air intake blower 53 and stale air exhaust blower 87.

The cross-sectional area of the air channels is establishes by the width of the exchanger extending between housing side walls 39, 41, respectively and the height of the channels. The width of the exchanger is adjusted within the allowable limit set by the installation space; e.g., the distance between wall support beams 9, 11, less any distance required for outer duct sections 59, 73, where the ventilator is to be mounted within a wall. The height of the channels is established by lateral displacement of the centers of fresh air outlet duct section 96 and stale air duct section 120, as seen in FIG. 3. By increasing or decreasing the cross-sectional area of the channels, the range of possible flow rates that may be established by blower 53 and 87 is likewise increased or decreased.

The efficiency of the exchanger is dependent upon the area of the heat transfer means; i.e., the area of the septum. As noted above, the area of the septum is determined by septum's width, and the septum's length; i.e., the length of the septum per turn times the number of septum turns.

The cross-sectional area of the channel sections, with the exception of sections 119 and 127 are constant. In sections 119 and 127, the cross-sectional area increases as the channels approach their respective ends 97, 121. This increase is due to the septum being wound upon cylindrical duct sections 96 and 120. The diameter of the duct section, and therefore the increase in the channel cross-sectional height at the channel, is selected to accommodate the flow of air moving out of and into the respective fresh air outlet 55 and the stale air inlet 67.

In accordance with this invention, to maximize cost savings, laminar flow is the fresh and stale air channels is preferred to turbulent flow. In the case of laminar flow, the pressure head required at the channels is minimized. As is well known in the art, the pressure head necessary to maintain a turbulent flow is greater than that required to maintain a laminar flow. By minimizing the pressure head requirements, the cost of electrical power consumed by blowers 53 and 87 is minimized, and with it the cost of ventilator operation. While laminar flow has a tendency to establish temperature strata which diminishes heat transfer efficiency as compared with the more uniform temperature distribution associated with turbulent flow, the improved efficiency provided by the "double" pass heat exchange process of this invention permits use of the lower efficiency laminar flow, with its lower cost of operation, while maintaining the flow rate—efficiency product at acceptable levels.

In operation, blower 53 draws fresh air 15 from space 13 at the prevailing outside temperature into inlet 43, and pushes it through to first end 95 of fresh air channel 91. Simultaneously, blower 87 draws stale air 23 from room 21 into inlet 67, and pulls it through to first end 121 of stale air channel 93. The fresh air and stale air are thereafter move through their respective channel sections in countercurrent direction to their respective outlets at fresh air channel second end 97 and stale air channel second end 123. On reaching these respective points, fresh air 19 is subsequently exhausted through outlet 55 into room 21 and stale air 25 is exhausted through outlet 79 to space 13. As can be seen in FIG. 3, the flow of air in the respective channels is countercurrent through all channel sections except 119 and 127, where flow is concurrent. In the course of traversing channel 91, the fresh air passes in heat transfer relation to stale air channel 93 twice, and is able to exchange heat with the stale air channel sections as the fresh air passes over and under the stale air channel.

While this invention has been described in its preferred form, it will be appreciated by those skilled in the art that changes may be made in the form, construction and arrangement of its elements without departing from its spirit or scope.

We claim:

1. A ventilator for replacing stale air with fresh air, and for exchanging heat between the stale air replaced and the fresh air, the ventilator comprising:
   a fresh air inlet for receiving fresh air;
   a fresh air outlet for exhausting fresh air;
   a stale air inlet for receiving stale air;
   a stale air outlet for exhausting stale air; and
   a heat exchanger for exchanging heat between the stale air and fresh air;
   wherein the fresh air inlet and outlet and the stale air inlet and outlet each include duct means for coupling the respective inlets and outlets to the heat exchanger such that fresh air entering and exiting the exchanger is segregated from stale air entering and exiting the exchanger and wherein the exchanger includes conduit means connected to the duct means for establishing a continuous fresh air channel and a continuous stale air channel, the fresh air channel being pneumatically isolated from the stale air channel, and heat transfer means for exchanging heat between air in the fresh air channel and air in the stale air channel, the fresh air channel and the stale air channel being wound one upon the other and upon at least a portion or a ventilator inlet duct means associated with one channel and at least a portion of a ventilator outlet duct means associated with the other channel such that air in the fresh air channel flows in a direction countercurrent to the direction of air flowing in the stale air channel over a majority of the stale air channel length, and such that air in the fresh air channel passes in heat exchange relation to the stale air channel twice.

2. The ventilator of claim 1 wherein the heat transfer means includes a septum having a first surface in heat transfer relation with the fresh air channel, and a second surface in heat transfer relation with the stale air channel, and wherein the septum first and second surfaces are in thermal communication with one another.

3. The ventilator of claim 2 wherein the conduit means includes a wall common to both the fresh air channel and the stale air channel which forms the septum of the heat transfer means.

4. The ventilator of claim 2 wherein the septum extends the length of the fresh air channel and stale air channel and separates the fresh air channel from the stale air channel the septum extending between the ventilator inlet duct portion and outlet duct portion upon which the fresh air channel and the stale air channel are wound, and, thereafter, extending in successive, spaced turns about the ventilator inlet duct portion and outlet duct portion upon which the fresh air channel and stale air channel are wound.

5. The ventilator of claim 4 wherein the fresh air channel and stale air channel have a combined ellipitcally shaped profile.

6. The ventilator of claim 5 wherein the fresh air channel includes a plurality of consecutive segments which are alternately arcuate and linear in form and the stale air channel includes a plurality of consecutive segments which are alternately arcuate and linear in form, and wherein the plurality of fresh air channel segments are interwoven with the plurality of stale air channel segments to form the combined elliptically shaped profile of the fresh air channel and the stale air channel.

7. The ventilator of claim 6 wherein the combined elliptical profile of the fresh air channel and stale air channel has two pseudo foci, a portion of the stale air inlet duct means being located at one foci, connected to a first end of the stale air channel, and a portion of the fresh air outlet duct means being located at the other foci connected to a second end of the fresh air channel, and wherein the stale air outlet duct means is connected at a second end of the stale air channel and the fresh air inlet duct means is connected at a first end of the fresh air channel.

8. The ventilator of claim 7 wherein the fresh air channel includes a blower means for moving air through the fresh air channel and exhausting it at the fresh air outlet, and wherein the stale air channel includes a blower for moving stale air through the stale air channel and exhausting it at the stale air channel outlet.

9. The ventilator of claim 8 wherein the fresh air blower means is located at the fresh air inlet and the stale air blower means is located at the stale air outlet, and wherein the fresh air blower means and the stale air blower means are controllable such that the flow rates in the fresh air channel and the stale air channel are variable.

10. A ventilator for replacing stale air with fresh air, and for exchanging heat between the stale air replaced and the fresh air, the ventilator comprising a fresh air inlet; a fresh air outlet; a stale air inlet; and a stale air outlet; and a heat exchanger, the heat exchanger including conduit means for establishing a fresh air channel and a stale air channel, the fresh air channel being pneumatically isolated from the stale air channel, the fresh air channel having a first end pneumatically coupled to the ventilator fresh air inlet and a second end pneumatically coupled to the ventilator fresh air outlet, the stale air channel having a first end pneumatically coupled to the ventilator stale air inlet and a second end pneumatically coupled to the ventilator stale air outlet, the heat exchanger also including heat transfer means for exchanging heat between air in the fresh air channel and air in the stale air channel, the conduit means and heat transfer means being arranged such that the fresh air channel and stale air channel are wound one upon the other and upon a portion of the ventilator inlet associated with one channel and a portion of a ventilator outlet associated with the other channel, the ventilator inlet portion and outlet portion upon which the fresh air and stale air channels are wound being displaced from each other in a plane common to the cross section of the ventilator inlet and outlet upon which the channels are wound so that air flowing in the fresh air channel passes in countercurrent heat exchange relation to air flowing in the stale air channel twice.

11. The ventilator of claim 10 wherein the heat transfer means includes a septum having a first surface in heat exchange relation with the fresh air channel and a second surface in heat exchange relation with the stale air channel, the first and second septum surfaces being in thermal communication, and wherein the septum is formed by a wall common to both the fresh air channel and the stale air channel, the wall extending between the portion of the ventilator inlet and the portion of the ventilator outlet upon which the fresh air channel and stale air channel are wound and, thereafter, extending in successive spaced turns about the portions of the ventilator inlet and outlet portions upon which the fresh air channel and stale air channel are wound.

12. The ventilator of claim 11 wherein the fresh air channel and the stale air channel each include a plurality of turns, which when interwoven have a combined elliptically shaped profile and two pseudo foci, at one of which a portion of a ventilator inlet is located, and at the other of which a portion of the ventilator outlet is located.

13. The ventilator of claim 12 wherein the fresh air channel includes a blower means for moving air through the fresh air channel and the stale air channel includes a blower means for moving air through the stale air channel.

14. The ventilator of claim 13 wherein the fresh air blower means is located at the fresh air inlet and the stale air blower means is located at the stale air outlet, and wherein the fresh air and stale air blower means are controllable such that the flow rates in the fresh air channel and the stale channel are variable.

* * * * *